United States Patent [19]

Albright

[11] 4,185,077

[45] Jan. 22, 1980

[54] METHOD OF RECOVERING URANIUM FROM AQUEOUS SOLUTION

[75] Inventor: Robert L. Albright, Churchville, Pa.

[73] Assignee: Rohm and Haas Company, Philadelphia, Pa.

[21] Appl. No.: 627,829

[22] Filed: Oct. 31, 1975

[51] Int. Cl.$^2$ ............................................. C01G 43/00
[52] U.S. Cl. ...................................... 423/7; 210/37 B
[58] Field of Search .................. 210/30, 32, 37, 37 M; 252/301.1 W; 260/2.1 E; 423/6, 7, 260, 261

[56] References Cited

U.S. PATENT DOCUMENTS

| | | | |
|---|---|---|---|
| 2,914,378 | 11/1959 | Kennedy | 423/7 |
| 3,743,695 | 7/1973 | George et al. | 423/7 |
| 3,843,566 | 10/1974 | Barrett | 210/37 |

FOREIGN PATENT DOCUMENTS 224683  8/1959  Australia ........................ 210/37 M

*Primary Examiner*—Edward A. Miller
*Attorney, Agent, or Firm*—Louis F. Kline, Jr.

[57] ABSTRACT

Anion exchange resin derived from insoluble crosslinked polymers of vinyl benzyl chloride which are prepared by polymerizing vinyl benzyl chloride and a crosslinking monomer are particularly suitable in the treatment of uranium bearing leach liquors.

4 Claims, No Drawings

METHOD OF RECOVERING URANIUM FROM AQUEOUS SOLUTION

This invention concerns a method of recovering uranium from uranium bearing leach liquors utilizing copolymeric resins of vinylbenzyl chloride (VBC) and a crosslinker, such as divinylbenzene, as anion exchange resins. Preferred embodiments of the process utilize gel type strong base VBC resins or macroreticular weak base VBC resins.

The uranium recovery processes of the prior art normally use large particle size gelular resins or macroreticular weak base resins to absorb and purify uranium bearing liquors and may normally be categorized into two headings, Resin-in-Pulp Processes and Clarified or Columnar Processes. In the former process the resins are contained in a basket and the leach liquor is allowed to contact the resin until the resin becomes saturated with the uranium salt, normally uranyl sulfate. At that time the resin undergoes an elution treatment to recover concentrated uranium salts. The resin particles normally have a mesh size of 20 plus. (U.S. Standard)

The second category or Columnar Process involves a prefiltration step after which the uranium bearing liquors are passed through a resin bed or resin filled column. Exhausted resins are eluted in generally the same manner. Resin particle sizes may vary in mesh sizes ranging from 20 to 50. Although these two categories of processes are usually performed in a discontinuous operation, recently continuous operations have become commercially attractive.

One important criterion in evaluating such processes is the elution performance of the resin. Understandably, the quicker a resin will elute the uranium salts the less acid is required and the more economically the process will operate. Additionally, resins having a high physical stability would also be favorably considered for processes such as uranium recovery where the resins are subjected to a great deal of physical demand.

The resins utilized in prior art processes have long been known to suffer high attrition losses during normal process conditions.

The life or durability of a resin is usually understood to be directly related to such characteristics as physical stability, thermal stability, organic fouling, oxidative stability and regeneration efficiency. A resin's physical stability is particularly important as a measure of its resistance to physical attrition since it is a direct reflection on the ability of the resin beads to withstand crumbling when subjected to heavy stresses. Physical stability may readily be calculated on the basis of results of the "Piston Pump Test", explained in more detail hereafter.

Another resin characteristic important in determining durability of a resin is its ability to withstand thermal degradation. This characteristic is normally termed thermal stability. Anion exchange resins in the hydroxide form are particularly susceptible to thermal degradation.

A third characteristic important in evaluating a resin is its regeneration efficiency which is normally determined by plotting the ratio of actual column capacity/theoretical column capacity (% utilization) versus the ratio of equivalents of regenerant used/total equivalents available.

It has now been discovered that anion exchange resin prepared from crosslinked vinylbenzyl chloride has surprisingly improved elution properties. It has also been discovered that these anion exchange resins remain suitable whether in gelular or macroreticular form. According to the invention there is therefore provided a process for recovering uranium from uranium bearing liquids which comprises contacting the liquids with a polymeric crosslinked vinyl benzyl chloride resin. Preferred embodiments include using a polymeric resin comprising a crosslinked macroreticular copolymer of (1) at least 90 parts by weight of monomer containing vinylbenzyl chloride and (2) at most 10 parts by weight of polyvinylidene monomer containing a plurality of $CH_2=C<$ groups in non-conjugated relationship, said copolymer containing reactive methylene chloride groups as substituents on the aromatic nuclei and being substantially free of secondary crosslinks. A further preferred embodiment will utilize sulphuric acid as an eluting agent. However other suitable eluting agents include brine, acidified brine, nitric acid and acidified ammonium sulphate.

The invention utilizes an additional advantage of the VBC resins in that it avoids the toxicity problems common during the preparation of the prior art resins. For example, a typical prior art resin is prepared by a process of first polymerizing or copolymerizing styrene and then chloromethylating the polymer. For further details of a typical prior art process, see U.K. No. 932,125 and U.S. Pat. No. 3,637,535. The chloromethylation process although widely used to provide polymers and ion exchange resins derived from such polymers possesses inherent disadvantages. For example, the chloromethyl ether used as chloromethylating agent to provide reactive chloro groups on the polymer is a substance of great toxicity. Consequently, expensive safety and protective equipment is required to safeguard operating personnel. Furthermore, the multi-stage nature of the prior art process makes it inherently more expensive than the one-step provess utilized to manufacture the polymers of the present invention. Another disadvantage of the polymers of prior art process is their vulnerability to metal contamination which may occur due to the metal-containing catalysts frequently employed in the manufacturing process. Accordingly the VBC resins useful in the practice of the present invention combine the advantages of improved physical stability and regeneration efficiency without loss of column capacity, in addition to the substantially improved elution performance when compared to the prior art. It is this combination in one resin which causes the resin to be highly suitable for uranium recovery. Furthermore, due to the simplified one-step preparation process these polymers so produced are inherently more economical to produce, making the process of the invention even more commercially attractive.

The desirable elution properties of the resins used in the present invention are believed to be related to the substantial absence of secondary crosslinking. The chloromethylated polymers of the prior art usually possess a considerable degree of such secondary crosslinking. See Rieman et al, Ion Exchange in Analytical Chemistry, page 11 (1970) for further details of secondary crosslinking.

To determine the elution performance of the resins they were compared to the prior art chloromethyl ether resins. These comparative experiments showed that whereas the elution concentration of the CME resins amounted to 7.7 g $U_3O_8$ per liter, the VBC resins showed an elution concentration of 9.9 g $U_3O_8$ per liter.

Similarly where an elution volume of acid of 7.2 bed volumes was required to elute prior art resins, the VBC resins required no more than 5.1 bed volumes of acid.

To determine the uranium capacity for strong base resins suitable for use in the process of the invention the following test was utilized:

Uranium Capacity Test for Strong Base Resins in Resin-In-Pulp
Screen 20 mls. of resin of the type described in Example I to the following meshes:

| Retained on Mesh | Mls. Resin |
|---|---|
| 16 | 0 |
| 20 | 0.5 |
| 30 | 3.75 |
| 40 | 18.75 |
| 50 | 1.75 |
| 325 | 0 |

2. Place resin in column and backwash and treat with 1 liter HCl (IN) followed by 1 liter of water.
3. Pass loading solution for 24 hours at a 160 mls./hr. rate. Loading solution is as follows:
$H_2SO_4$—94.05 g/19 liters
$Na_2SO_4$—796.5 g/19 liters
$UO_2SO_4$—29.0 g/19 liters
4. Rinse with 1 bed volume of water
5. Elution is performed with 10% $H_2SO_4$ at 40 ml/hr.
6. Continue elution until the $U_3O_8$ level is 0.04 g/l.
7. Analyze the entire eluate and calculate the capacity as follows:

$$Capacity = \frac{g/l\ U_3O_8 \times liter\ eluate}{liter\ resin}$$

Following the test procedure of above the strong base resins showed a capacity of approximately 58 g/$U_3O_8$ liter of resin. The same resin after undergoing the above test procedure was tested for elution concentrate. The effluent was collected and analyzed spectrophotometrically and showed a uranium concentration of 11.4 g $U_3O_8$/l.

The resins useful in the process of the present invention may be prepared by any suitable known process. A preferred polymerization technique however is suspension polymerization, particularly when macroreticular resins are desired. The term "suspension polymerization" is a term well known to those skilled in the art and comprises suspending droplets of the monomer or monomer mixture in a medium in which the monomer or monomer mixture is substantially insoluble. This may be accomplished by adding the monomer or monomer mixture with any additives to the suspending medium which contains a dispersing or suspending agent such as, for instance, in the case of an aqueous suspending medium, the ammonium salt of a styrene maleic anhydride copolymer, carboxymethyl cellulose, bentonite, polyvinylimidazoline, or poly(diallyldimethylammonium chloride). The dispersant is preferably added in an amount of 0.001 to 5%, more preferably from 0.01 to 1%.

Often polymerization processes will utilize additives or modifiers which have specialized functions. These additives should of course be chosen such as to be mutually compatible. For example a preferred colloidal stabilizer for the process of the invention is gelatin. Gelatin has an isoelectric point at about pH 8. It should therefore be readily understood that when gelatin is the stabilizer the pH of the polymerization medium should not pass through this point to prevent possible serious impariment of the bead forming mechanism. Another stabilizer which may be useful in the process of the invention is magnesium silicate. Being an inorganic additive, the pH of a polymerization medium containing magnesium silicate instead of gelatin does not require such pH limitation.

Alkalinity of the polymerization medium may be maintained by one or more additions of a suitable base or the presence of a sufficient amount of buffering compounds. Other methods of maintaining an alkaline medium during polymerization will occur to those skilled in the art.

The polymerization of vinylbenzyl chloride and crosslinker may be accelerated by a suitable catalyst.

Catalysts which provide free radicals which function as reaction initiators include benzoyl peroxide, tert-butyl hydroperoxide, cumene peroxide, tetralene peroxide, acetyl peroxide, caproyl peroxide, tert-butyl perbenzoate, tert-butyl diperphthalate, methyl ethyl ketone peroxide. Other suitable classes of free radical generating compounds include the azo catalysts.

Another method of effecting copolymerization is by subjecting the reaction mixture to ultra-violet light in the presence of suitable catalysts at ambient or slightly elevated temperatures. Such catalysts include benzoin and azobisisobutyronitrile.

The amount of catalyst required is roughly proportional to the concentration of the mixture of monomers, The usual range is from 0.01% to 3% by weight of catalyst, with reference to the total weight of the monomer mixture. The preferred range is from 0.5% to 1.5%. The optimum amount of catalyst is determined in large part by the nature of particular monomers selected, including the nature of the impurities which may accompany said monomers.

As is known in the art, macroreticular polymers are prepared by a process which involves the presence of a phase extender or precipitant. These precipitants vary widely in nature and are chosen to be particularly suitable with the monomer mixture used. For example, when employing monomers such as divinylbenzene as crosslinking monomers, alkanols with a carbon atom content of from 4–10 will suffice when used in amounts of from 30–50% of total polymer mixture used. Other suitable precipitants are aliphatic hydrocarbons containing at least 7 carbon atoms, such as heptane and isooctane. In general, the amounts of precipitant may vary from as little as 10% to as much as 80% of combined weight of monomer and precipitant.

A preferred precipitant is methyl isobutyl carbinol, preferably used in an amount of from 25–45% of total monomer mixture.

The polymerization process may be carried out at temperatures ranging from 60° to 100° C., although preferably the polymerization is performed between 70°–90° C.

The vinylbenzyl chloride resins of the invention are hereinafter referred to as VBC resins. The prior art chloromethylated resins are referred to as CME resins.

The following table shows the effect of varying the amount of precipitant - methyl isobutyl carbinol (MIBC) on Anion Exchange Capacity (AEC), percent solids and copolymer porosity. The VBC resins of the table are typical strong base anion exchange resins of the type shown in Example I varying in amount of precipitant only and containing 6% divinylbenzene (DVB) as crosslinker:

Table I

| Resin No. | % MIBC | AEC (meq/g) | Solids (%) | Copolymer Porosity (%) |
|---|---|---|---|---|
| 1 | 28 | 4.31 | 41.4 | 3.5 |
| 2 | 30 | 4.36 | 38.6 | 20.2 |
| 3 | 35 | 4.38 | 33.6 | 29.8 |
| 4 | 40 | — | — | 46.2 |

While the use of a single precipitant facilitates recovery, purification and recycling of the precipitant, mixtures of precipitants can be used.

A preferred crosslinking monomer is divinyl benzene, but many alternative crosslinkers are suitable for use in the process of the invention. Suitable crosslinkers are divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono-, or dithio- derivatives of glycols, and of resorcinol; divinylketone, allyl acrylate, diallyl fumarate, diallyl maleate, trimethylolpropane trimethacrylate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylene-diacrylamide, N,N'-methylene dimethacrylamide, N,N'-ethylenediacrylamide, 1,2-di(α-methylmethylene sulfonamide)ethylene, trivinylbenzene, trivinylnaphthalene, and polyvinylanthracenes.

Other useful crosslinking monomers include the following: polyvinylaromatic hydrocarbons, such as trivinylbenzene, glycol dimethacrylates, such as ethylene glycol dimethacrylate, and polyvinyl ethers of polyhydric alcohols, such as divinoxyethane and trivinoxypropane.

The ratio of vinylbenzyl chloride monomer to crosslinking monomer may vary depending on the use for which the copolymer is intended and upon the nature of crosslinker, although generally the crosslinker is present in an amount of 0.1 to 30%. Preferably it is present in an amount of 1 to 10% and most preferably in an amount of 5 to 8%. It is also possible to utilize a mixed crosslinking system. The following Table II illustrates the effects of alternative crosslinking systems and amounts on anion exchange capacity. The resins of Table II are typical strong base anion exchange resins varying only in crosslinker.

Table II

| Resin No. | AEC (meq/g) | DVB, %* | TMPTMA** |
|---|---|---|---|
| 5 | 4.52 | 1.5 | 2 |
| 6 | 4.10 | 2 | 12 |
| 7 | 4.02 | 3 | 6 |

*Divinyl benzene activity 79.2% - remainder primarily ethylvinylbenzene.
**TMPTMA is trimethylolpropane trimethacrylate.

As mentioned hereinbefore various precipitants or phase extenders are suitable in the practice of the invention. Iso-octane (IO) and 2-ethylhexanol(2-EH) were tested and the results are listed in the following Tables III and IV. Resins 12-15 were converted to weak base resins by aminolysis with dimethylamine, and are of the type shown in Example II. Resins 7-11 are strong base resins containing 6% DVB, of the type shown in Example I.

Table III

| Resin | %IO* | Porosity, (vol. %) | AEC(meq/g) | % Solids |
|---|---|---|---|---|
| 7 | 20 | — | 4.43 | 43.0 |
| 8 | 25 | 32.6 | 4.34 | 35.5 |
| 9 | 30 | 46.4 | — | — |
| 10 | 50 | 65.0 | — | — |
| 11 | 55 | 69.0 | — | — |

Table IV

| Resin | 2-EH,%* | Porosity, (Vol%) | AEC (meq/g) | % Solids | Product Porosity, (Vol%) |
|---|---|---|---|---|---|
| 12 | 25 | 2.6 | 4.63 | 54.1 | — |
| 13 | 30 | 2.5 | 5.09 | 53.5 | — |
| 14 | 35 | 27.5 | 4.90 | 54.4 | 24.9 |
| 15 | 40 | 48.8 | 4.78 | 35.3 | 48.9 |

*The percentages of precipitants are based on total monomer mixture weight.

A wide variety of amines can be employed in the amination reaction. Thus, primary, secondary, and tertiary alkylamines or arylamines can be employed. Polyalkylenepolyamines include ethylenediamine, diethylenetriamine, triethylenetetramine, tetraethylenepentamine, dimethylamine, trimethylamine, propylenediamine, and the like. Aminoalcohols such as dimethylaminoethanol can also be used successfully.

A preferred resin of the process of this invention employs a trialkylamine as the aminating agent, thus producing strong base, quaternary ammonium anion exchangers. The alkyl radical does not generally contain more than 4 carbon atoms, with trimethylamine being the preferred amine.

The following examples I and II illustrate methods of preparing the resins used in the practice of the invention. They should not be construed as limiting the scope of the invention. All percentages throughout the specification and claims are by weight unless otherwise indicated. Example III illustrates a known process of preparing a typical CME resin which corresponds in type to a resin prepared according to Example I.

EXAMPLE I

Preparation of a Macroreticular Type I Strong Base Resin 680 grams of water are placed in a flask. To the stirred aqueous phase, is added 4.4 g. of gelatin dissolved in 50 ml of water, 6.4 g. poly(diallydimethylammonium chloride) dispersant, 8.3 g. of boric acid, and 10.0 g. of 50% sodium hydroxide. The resulting solution is stirred for 30 minutes.

To the aqueous phase is added a solution of 475 g. of vinylbenzyl chloride, 39.0 g. of divinylbenzene (79.2% active), 276.7 g. of methyl isobutyl carbinol and 5.1 g. of benzoyl peroxide. The resulting mixture is heated with stirring to 80° C. and is held at that temperature for 10 hours. The inert solvent is removed by steam distillation and the resulting copolymeric beads are dried in a steam oven.

82.5 g. of beads and 400 g. of water are placed in a flask and stirred for 30 minutes. To the resulting slurry is added 34 gm. of anhydrous trimethylamine and the mixture is stirred for 4 hours at 60° C. The temperature is increased slowly to 100° C. in order to remove the excess amine. The resulting mixture is cooled and the beads are washed and bottled. The resulting strong base resin has an anion exchange capacity of 4.36 meq/g, a solids content of 34% and a porosity of 0.4 cc/cc.

EXAMPLE II

Preparation of a Macroreticular Weak Base Resin 680 grams of water are added to a flask. To the stirred aqueous phase is added 5.8 g. of poly(diallyldimethylammonium chloride), 4.0 g. of gelatin, 9.4 g. of boric acid, and 9.2 g. of 50% sodium hydroxide. The resulting solution is stirred and the monomer phase consisting of 410 g. of vinylbenzyl chloride, 40 g. of divinylbenzene (79.2% active), 264 g. of methylisobutyl carbinol, and 6.4 g. of benzoyl peroxide is added to the flask. The resulting mixture is heated to 80° C. for 10 hours and the inert solvent is removed by steam distillation. The resulting beads are washed with water and are dried in a steam oven overnight.

400 grams of the above copolymer are slurried in 390 ml of water and 360 g. of 50% sodium hydroxide. To this mixture is added 610 ml of 40% dimethylamine. The mixture is heated to 65° C. and is held at that temperature for 4 hours. At the end of that period the excess amine is removed by distillation and the product is washed to neutrality and bottled. The resulting weak base resin has a capacity of 5.28 meq/g and a solids content of 42.8%

The following additional step, if desired, is optional. To 136 g. of the above weak base resin in 195 g. of water is added 18.1 g. of 30% hydrogen peroxide to convert the resin to the amine oxide form to the extent of 19.7%. The mixture is stirred at 50° C. for 4 hours, the beads are washed with water and bottled.

The resulting weak base resin in the amine oxide form has a capacity of 5.11 meq/g and a solids content of 38.5%. The porosity is 0.46 cc/cc of beads.

EXAMPLE III

Preparation of Comparative Resin A

To 750 g. of water is added 4.4 g. of gelatin dissolved in 50 ml of water, 6.4 g. of polyvinylimidazoline dispersant, 4.0 g. of boric acid, and 5.0 g. of 50% sodium hydroxide. The resulting aqueous phase is stirred for 30 minutes.

To the aqueous phase is added a solution consisting of 447 g. of styrene, 35 g. (55% active) of DVB, 318 g. of MIBC, and 4.8 g. of benzoyl peroxide. The resulting mixture is stirred rapidly at 80° for 10 hours and the inert solvent is removed by steam distillation. The resulting copolymeric beads are dried in a steam oven.

To 318 g. of the above copolymer is added 1260 g. of CME and 660 g. of ethylene dichloride. The resulting mixture is stirred at 35°–40° C. for two hours. The mixture is cooled to 0°–5° C. and 275 g. of aluminum chloride is added over a two hour period while maintaining the temperature below 25° C. The reaction mixture is then heated at 47°–50° C. for a four hour period.

The resulting bead slurry is cooled to 0°–5° C. and is quenched into 1500 ml of cold water. The quenched mixture is drained and washed four times with 1500 ml portions of water. The last wash is not removed and is adjusted with 20% solution of sodium carbonate to pH 8. The resulting product is drained and packed out.

To one third of the above chloromethylated intermediate slurry is added 290 g. of 25% aqueous trimethylamine (TMA) over a 1–1.5 hour period while maintaining the temperature at 10°–15° C. After the amine addition is complete, the mixture is stirred for four hours at 10°–15°. The excess amine and solvent are removed by steam distillation and the beads are washed with water to give the final product.

The uranium recovery process of the present invention places a premium on the physical stability of an ion exchange resin. The piston pump test is an accelerated test developed to measure an ion exchange resin's resistance to attrition under simulated and exaggerated conditions.

Piston Pump Test

The test is performed in 200 ml of resin in one inch diameter columns operating under constant pressure (40 lbs/psi). The resin is subjected to repeated cycles of treatment with 1.2 N-$H_2SO_4$ and 3.5 N-NaOH with water rinses between each solution. The acid and base solutions are passed upflow through the resin bed and the water rinses are passed downflow. Cycling is controlled automatically by a programmer, and the flow rates during exhaustion (acid) and regeneration (base) are measured every five cycles. The test is stopped after 50 cycles, since a good correlation has been developed between field performance and piston pump test performance at this level. The change in flow rate from the initial reading to that following 50 cycles is an excellent measure of the resin's physical stability. If breakdown occurs, smaller resin particles (fines) are being formed, and at constant pressure, a drop in flow rate would be observed. Conversely, if the resin exhibits no physical breakdown, the particle size remains essentially constant and hence the flow rate stays constant.

A second measure of resin stability in the piston pump test is the change in perfect bead count in the resin sample after 50 cycles. Representative resin samples taken before and after the test are examined microscopically for cracked beads. Obviously, the higher the perfect bead count after the test, the more stable the resin.

Macroreticular, strong base anion exchange resins prepared from vinylbenzyl chloride according to Example I exhibit excellent physical stability in the piston pump test compared to resins prepared from chloromethylated styrene according to comparative Example III. Typical results obtained for a CME resin and for a VBC resin are given below.

| Resin | AEC meq/g | Flow Rate, liter/hr. Initial | Flow Rate, liter/hr. Final | % Change Flow | % Perfect beads Before | % Perfect beads After |
|---|---|---|---|---|---|---|
| VBC(Ex.1) | 4.36 | 100 | 100 | 0 | 99 | 99 |
| CME(Comp. Ex.III) | 4.40 | 100 | 70 | 30 | 99 | 85 |

The test results were obtained on resin samples that were screened to the exact same particle size, therefore, the marked improvement in performance exhibited by the VBC resin can be directly attributed to its manner of preparation and not to variance in particle size distribution.

Quaternary ion exchange resins may be somewhat liable to decomposition particularly when in the hydroxide form. This instability is greatly enhanced by increased temperature. Two routes are followed by this decomposition reaction.

(1) Resin-$CH_2$—N—($-CH_3$)+$OH^-$ Resin-$CH_2OH$+$N(CH_3)_3$
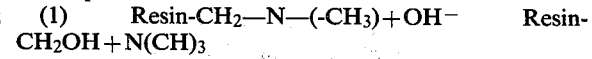

(2) Resin-$CH_2$—N—($-CH_3$)$_3$+$OH^-$ Resin-$CH_2N$—($-CH_3$)$_2$+$CH_3OH$
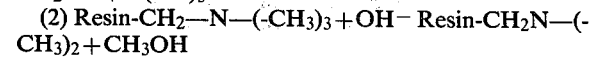

In order to test the useful ion exchange resins for thermal stability, strong base anion exchange vinyl benzyl chloride resins of the type described in Example I and a corresponding chloromethylated resin as described in comparative Example III are subjected to the following test.

The resin as received is converted completely to the hydroxide form using approximately 1000 mls. of 1 N NaOH for 15 mls. of resin. The resin is rinsed with D.I. water and placed in an appropriate container containing excess D.I. water (at least a 20 to 1 water to resin ratio) and the container is placed in an oven of appropriate temperature. Periodically the sample is removed, completely converted to the HCl form and evaluated for solids content, and true strong base capacity. After this, the resin is reconverted to the hydroxide form using 1 N-HCl followed by 1 N-NaOH and replaced in the same temperature environment. Several spot checks are made at all temperatures to confirm that the resins are completely in the hydroxide form during the testing periods. The results indicate that the VBC resins have consistently greater thermal stability than the corresponding CME resins.

A further advantage that the strong base VBC resins have over prior art CME resins is improved regeneration efficiency. The true regeneration efficiency of a strong base resin is determined by plotting the ratio - actual column capacity/theoretical column capacity (% utilization), versus the ratio - equivalents of regenerant used/total equivalents available. A typical VBC resin when tested for regeneration efficiency as defined above and in accordance with known analytical procedures showed a significant improvement when compared to the regeneration efficiency of a typical and corresponding CME resin. The improved regeneration efficiency of VBC over the CME resins at normal use levels of regenerant is in the range of at least about 10% and may be as high as 30% for some embodiments under preferred conditions. The significance of this improved regeneration efficiency is that the end user can use less regenerant to achieve a desired column capacity when using VBC resins than he can when using the CME resins, thereby, greatly reducing his overall regenerant costs.

EXAMPLE IV

The adsorption of uranium from an aqueous solution containing uranyl sulfate was accomplished on a 20 ml. bed of classified, 20-30 mesh cut (U.S. Sieve Series), random close-packed VBC resin in the chloride form. The VBC resin was a terpolymer of N-vinylphenyl -N,N,N- trimethyl ammonium chloride, divinylbenzene and ethylvinylbenzene. The uranium solution contained 1.0 g $U_3O_8$ and 30 g. $Na_2SO_4$ per liter of solution at pH 1.8 with $H_2SO_4$. The loading flow rate was 168 bed volumes of solution per hour and the elution flow rate was 2.0 bed volumes per hour. The results are summarized in to following table:

| example | Crosslinking by DVB Wt. % | Uranium Capacity | | | |
| --- | --- | --- | --- | --- | --- |
| | | To 5% Breakthrough $gU_3O_8$/liter | Saturation $gU_3O_8$/liter | Eluent Vol. Ratio Bed Vols. | Eluate Concentration $gU_3O_8$/liter |
| 1. | 1.453 | 2.5 | 6.75 | 2.5 | 2.70 |
| 2. | 2.883 | 7.5 | 14.1 | 3.0 | 4.70 |
| 3. | 4.289 | 21.5 | 25.75 | 3.0 | 8.58 |
| 4. | 5.673 | 21.5 | 39.5 | 4.4 | 8.98 |
| 5. | 7.035 | 36.0 | 53.5 | 5.5 | 9.73 |
| 6. | 8.375 | 46.5 | 56.5 | 7.5 | 7.53 |
| 7. | 9.694 | 42.0 | 60.0 | 9.0 | 6.67 |
| 8. | 10.993 | 41.5 | 64.5 | 15.0 | 4.30 |
| 9. | 13.530 | 49.0 | 67.5 | 17.5 | 3.86 |
| 10. | 15.991 | 30.0 | 64.0 | 25.0 | 2.56 |

We claim:

1. A process for recovering uranium from uranium bearing leach liquors which comprises contacting the leach liquors with a polymeric crosslinked vinyl benzyl chloride anion exchange resin, thereafter eluting from the resin the uranium in concentrated salt form.

2. A process as claimed in claim 1 wherein the uranium bearing leach liquors are contacted with a gelular strong base polymeric vinyl benzyl chloride anion exchange resin.

3. A process as claimed in claim 1 wherein the uranium bearing leach liquors are contacted with a macroreticular weak base polymeric vinyl benzyl chloride anion exchange resin.

4. A process as claimed in claim 1 wherein the elution step comprises contacting the resin with sulfuric acid and recovering uranium values in the uranyl sulfate form.

* * * * *